United States Patent [19]

Young

[11] Patent Number: 5,289,094
[45] Date of Patent: Feb. 22, 1994

[54] LIGHT RESPONSIVE AIRFLOW REGISTER

[76] Inventor: Charles C. Young, 121 N. Almansor, Alhambra, Calif. 91801

[21] Appl. No.: 20,728

[22] Filed: Feb. 22, 1993

[51] Int. Cl.$^5$ .................... G05D 23/00; F24F 7/02
[52] U.S. Cl. ...................... 318/468; 318/471; 236/49.3; 236/49.5
[58] Field of Search .................. 318/434–480, 318/16, 6, 7, 471; 236/49.3, 46 R, 47, 1 G, 49.5, 51, 44 C; 165/2, 11.1, 12, 26, 27

[56] References Cited

U.S. PATENT DOCUMENTS

| Re. 31,502 | 1/1984 | Gingras | 361/170 |
|---|---|---|---|
| 3,801,008 | 4/1974 | Wenger | 236/46 |
| 3,825,182 | 7/1974 | Bauchmann | 236/49.3 |
| 4,407,447 | 10/1983 | Sayeh | 236/49.3 |
| 4,434,932 | 3/1984 | Hara et al. | 236/49.3 |
| 4,553,695 | 11/1985 | Grant | 236/9 A |
| 4,623,969 | 11/1986 | Bensoussan | 364/505 |
| 4,671,458 | 6/1987 | Fukuda et al. | 236/49.3 |
| 4,824,012 | 4/1989 | Tate | 236/49.5 |
| 4,916,642 | 4/1990 | Kaiser et al. | 364/550 |
| 4,942,348 | 7/1990 | Nilssen | 318/468 |
| 4,969,508 | 11/1990 | Tate | 165/22 |
| 5,100,053 | 3/1992 | Manson et al. | 236/47 |
| 5,119,987 | 6/1992 | Kobayashi | 236/49.3 |

Primary Examiner—Paul Ip
Attorney, Agent, or Firm—Jack C. Munro

[57] ABSTRACT

An airflow register for an air conditioning system for an enclosure such as room within a house or an office within a building. The register includes a series of louvers which can be located in either an open position or a closed position. The open position permits air to flow through the register and the closed position prevents air from flowing through the register. Louvers are to be movable by a motor with this motor being operated by a light sensor mounted on the exterior surface of the register. Upon an observable lightened environment being detected by the light sensor, the motor is activated which will locate the louvers in the open position. Upon an observable darkened condition being sensed by the light sensor, the motor is activated which will locate the louvers in the closed position. A flow limiter may be used to keep the louvers slightly open when in the closed position to have some heated air enter the room when the ambient temperature is severely cold.

7 Claims, 1 Drawing Sheet

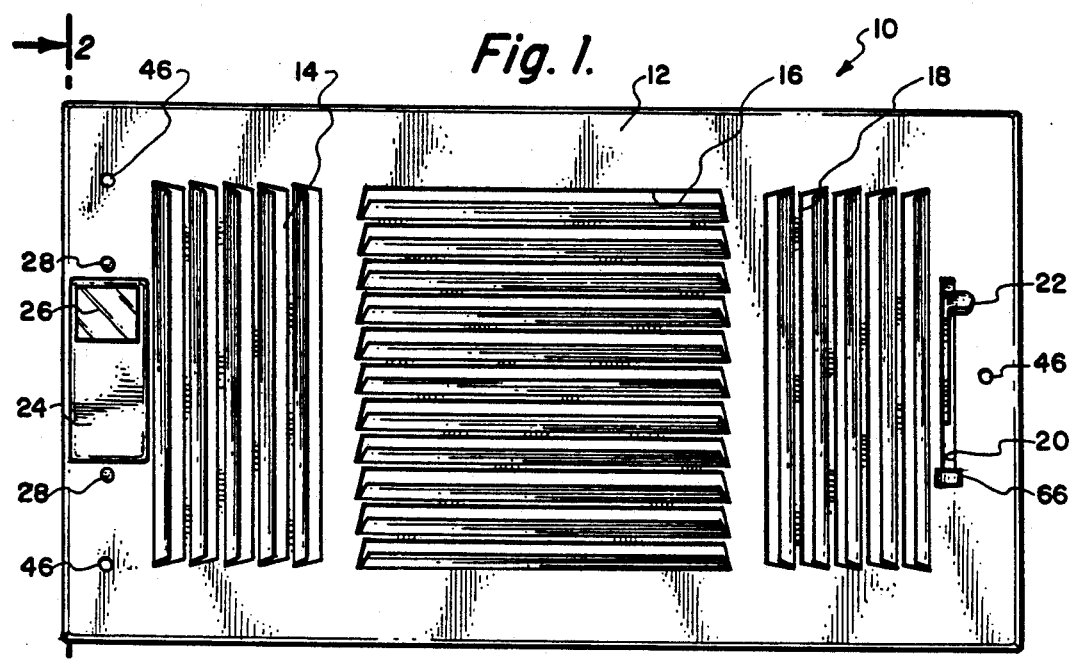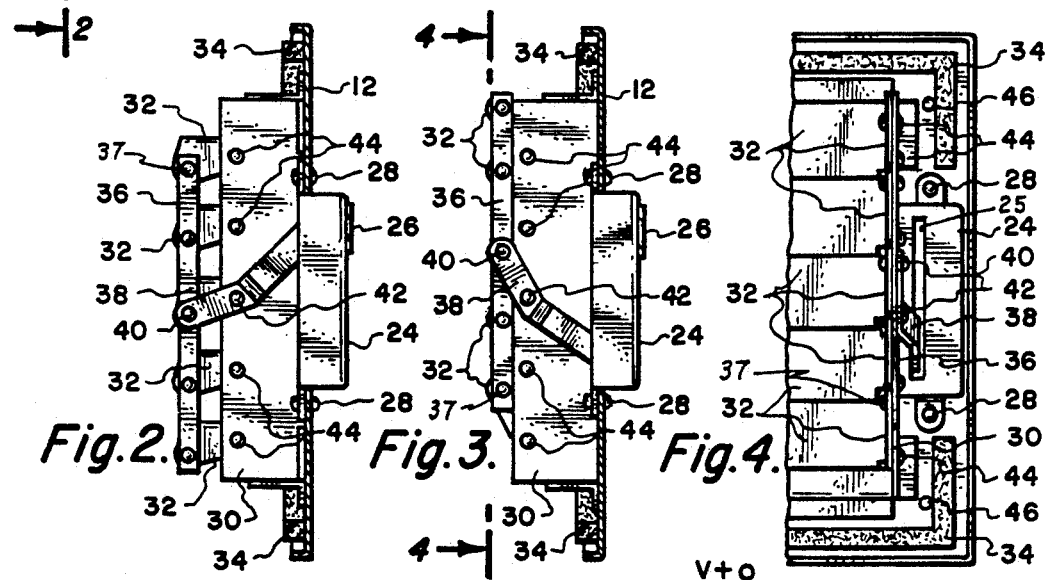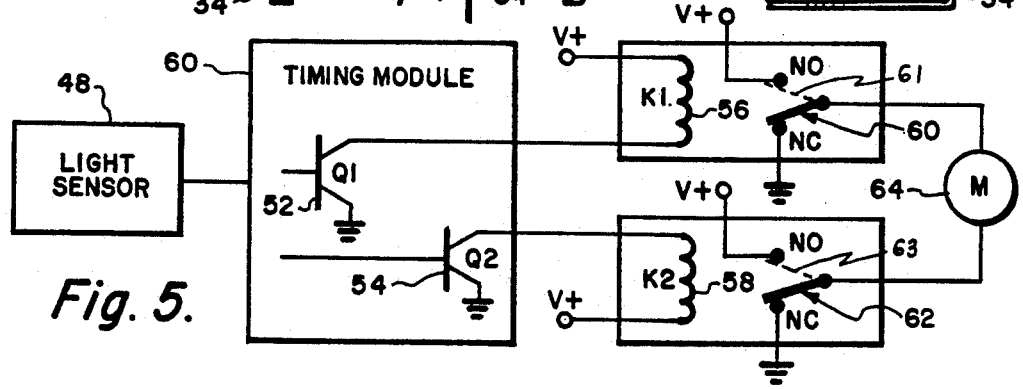

LIGHT RESPONSIVE AIRFLOW REGISTER

BACKGROUND OF THE INVENTION

1) Field of the Invention

This invention relates to an enclosure air conditioning apparatus for rooms of houses and offices and more particularly to an airflow register which automatically is located either in an open position permitting passage of air therethrough or in a closed position preventing passage of air therethrough by respectively sensing of light or no light within the enclosure.

2) Description of the Prior Art

Air conditioning of an enclosure involves heating of the enclosure when the ambient temperature is below the comfortable level for a human and cooling the enclosure when the ambient temperature is above the comfortable level of a human. A common way to control the temperature within an enclosure is by a way of forced air heating and cooling. Included within the enclosure are a series of ducts with each duct being connected to the heater and air conditioner. The heater and air conditioner supplies heated and cooled air, respectively, into the ducts which in turn conducts the air to remote locations within the enclosure. Within forced air heating and cooling systems, a thermostat is required to control these systems. A thermostat is to be set at a prescribed temperature. If the enclosure temperature departs from the prescribed temperature, cooling or heating is appropriately activated to bring the enclosure temperature to the prescribed temperature.

Normally, a single thermostat will serve a single forced air central system. There is normally involved a plurality of different rooms within this single forced air central system. Registers are placed over the duct inlets into each room. The register constitutes a grill which covers the end of the duct in a generally attractive manner. This grill includes a series of louvers and these louvers can be moved from an open position to a closed position. With the louvers in a closed position, air from within the duct is not permitted to flow into the room. Only when the louvers are in the open position can heated or cooled air from the duct flow into the room. Therefore, airflow into the room is controlled by opening and closing of the louvers of the register of that room.

Within any home or business, there invariably are rooms that are not being utilized. If heat is being supplied to the central system based on a reading from a thermostat, the heat is being supplied to all rooms. The same is true for cooling. Heating or cooling may not be required in several of the rooms. However, heating and cooling is being supplied to the rooms which becomes a significant added expense to the homeowner or landlord of the business.

Generally a room when occupied is in a lighted condition. Generally also it can be said that for most rooms that, when the rooms are dark, the rooms are empty with the possible exception when humans are sleeping. Within most of the rooms, with the possible exception of the bedroom, the airflow can be eliminated or greatly reduced when the room is not lighted. This will save a substantial amount of expense in conjunction with heating and cooling for homes and offices each and every month.

SUMMARY OF THE INVENTION

An airflow register for an enclosure which is mounted across the access opening of an airflow duct into the enclosure. The airflow register includes an airflow volume control in the form of a series of louvers which are to be movable from a closed position to an open position. When the louvers are in the closed position, no air is conducted through the register. When the louvers are in the open position, air is permitted to pass through the register. Operation of the louvers is to be controlled automatically by a motor which is activated by a light sensor. This light sensor is to detect whether there is light within the enclosure. If there is no light within the enclosure, the light sensor operates the motor to move the louvers to the closed position. A separate flow limiter may be used to prevent the louvers from completely closing permitting some heated air to enter the room when the ambient temperature is severely cold. With light being detected in the enclosure, the motor is activated which positions the louvers in the open position.

The primary objective of the present invention is to construct an apparatus which automatically operates an airflow register within an enclosure so that air will be supplied within the enclosure when the enclosure is occupied and to terminate or greatly reduce the flow of air within the enclosure when the enclosure is not occupied.

Another objective of the present invention is to construct an energy saving device which is to decrease the amount of energy that is consumed within a home or business establishment.

Another objective of the present invention is to construct an energy saving device which can be manufactured relatively inexpensively and therefore sold to the ultimate consumer at an affordable price.

BRIEF DESCRIPTION OF THE DRAWING

FIG. 1 is a front view of a conventional airflow register within which has been incorporated the apparatus of the present invention;

FIG. 2 is a left side view of the airflow register of the present invention showing in more detail the structural interconnection between the airflow register and the apparatus of the present invention with the airflow register in the open position taken along line 2—2 of FIG. 1;

FIG. 3 is a view similar to FIG. 2 but showing the airflow register in the closed position;

FIG. 4 is a back view of a portion of the airflow register taken along 4—4 of FIG. 3; and FIG. 5 is a view of the electrical operating circuit of the apparatus of the present invention.

DETAILED DESCRIPTION OF THE SHOWN EMBODIMENT

Referring particularly to the drawing, there is shown the airflow register 10 of this invention. The airflow register 10 of this invention includes a register face panel 12 which has formed therein a first series of vertical oriented openings 14 and a second series of vertically oriented openings 18. In between the openings 14 and 16 are located a series of horizontally disposed openings 16. Also included within the face panel 12 is a slot 20 which is located directly adjacent the second series of vertically oriented openings 18. Within the slot 20 is located a lever 22. Lever 22 is capable of being manually operated by a human to be moved is from one end of slot 20 to the opposite end of slot 20. The lever 22 is essentially identical to lever 38 which is mounted directly adjacent the first series of vertical oriented openings 14. The purpose of lever 22 is to manually move the louvers 32 between the open and closed positions shown respectively in FIGS. 2 and 3. With the louvers 32 in the open position, air is capable of being conducted through the openings 14, 16 and 18. With the louvers 32 in the closed position, airflow is not permitted through the openings 14, 16 and 18.

Also included through the face panel 12 are a series of holes 46. Holes 46 are to facilitate location of a conventional fastener such as a screw in order to mount the airflow register 10 in this invention on a wall (not shown) of an enclosure such as a room or office. The airflow register 10 of this invention is to be placed over the access opening of a duct (not shown) within the room or office.

Each of the louvers 32 are to be movable simultaneously by means of a bar 36 which is pivotly connected to each of the louvers 32 by means of pivot pins 37. It is to be understood that the lever 22 will be similarly connected to another bar 36 and to louvers 32. Each of the louvers 32 are pivotly mounted between side plates 30 with only one such side plate 30 being shown. It is to be understood that there will be a second side plate 30 located directly adjacent the lever 22. The side plates 30 are fixedly mounted to the interior surface of the face panel 12.

Also mounted on the interior surface of the face panel 12 is a resilient seal 34. It is the function of the seal 34 to provide an essentially air tight connection with the wall of the surface of upon which it is mounted so that air will only be permitted to flow through the openings 14, 16 and 18 and not be permitted to escape or leak from the sides of the face panel 12.

The outer end of the lever 38 is pivotly connected by pivot pin 40 to a bar 36. Intermediate the ends of the lever 38 is a pivot pin 42 which mounts the lever 38 onto the side plate 30. It is to be understood that the lever 22 will be similarly mounted on its respective side plate (not shown). Each of the louvers 32 are pivotly connected to the side plate 30 by means of a pivot pin 44.

Fixedly mounted on the front surface of the face panel 12 by means of rivets 28 is a housing 24. It is to be understood that an appropriate hole will be formed within the face panel 12 in order to accommodate the housing 24. The housing 24 includes a window 26. Mounted within the housing 24 and associated with the window 26 is a light sensor 48. The lever 38 is conducted through a slot 25 formed within the back surface of the housing 24. The lever 38 is to be movable from the open position shown in FIG. 2 to the closed position shown in FIG. 3 and vice versa by means of a motor 64. The motor 64 is mounted within the housing 24.

The light sensor 48 can comprise any conventional or available light sensor in common use and manufactured by many manufacturers. The light sensor 48 senses continuous light for a period of time, such as fifteen seconds, after which the transistor 52 is activated which energizes relay coil 56. Activation of relay coil 56 will cause relay contact 60 to move to the normally open position such as is shown by dotted line 61 in FIG. 5. This is what causes the motor 64 to be driven in a direction to move the louvers 32 to the position shown in FIG. 2. Once the louvers 32 are in the position of FIG. 2, the motor 64 is deactivated, relay coil 56 is deactivated, relay contact 60 moves back to its normally closed position shown by the solid line in FIG. 5 and the transistor 52 is deactivated.

If the light sensor 48 detects fifteen seconds of continuous darkness, the transistor 54 is activated which in turn activates relay coil 58. Activation of relay coil 58 causes the relay contact 62 to move to the dotted line position 63 which will operate the motor 64 in the reverse direction which will result in the louvers 32 being moved to the closed position shown in FIG. 3. Once the louvers 32 are in the closed position, the motor 64 is deactivated, relay contact 62 moves back to its normally closed position, relay coil 58 is deactivated as well as transistor 54. The transistors 52 and 54 are part of a timing module 60 which is deemed to be conventional and readily available on the open market. It is the purpose of the timing module 60 to include appropriate circuitry (not shown) which is to provide for the delay of time, such as fifteen seconds, in which either transistor 52 or 54 is to be operated. It is also to be considered to be within the scope of this invention that this time period of fifteen seconds can be increased or decreased.

It is to be understood that the relay coils 56 and 58 are to be connected to a source of electrical energy which generally will comprise conventional household current of 115 volts or DC battery power. The normally open position of each of the relay contacts 60 and 62 is connected to the same source of electrical current so that the motor 64 can be operated.

One of the advantages of this invention is that the thermostat of a house or building can be lowered at night when heat is required. The air flow is being concentrated in only a small portion of the house or building at night permitting substantial lowering of the thermostat. When a thermostat is lowered ten degrees Fahrenheit fifty percent of the time, thirty percent less energy is used. It is to be understood that similar figures are applicable when cooling is required.

In severe weather, the temperature may fall to below freezing. It is desirable to supply some heat to each room even if it is unoccupied. To accomplish this, the user inserts a flow limiter 66 in the lower end of slot 20. Flow limiter 66 comprises no more than a plug that is to be easily manually inserted in slot 20 and then to be easily manually removed when the weather conditions are no longer severe. Flow limiter 66 is designed to be snug within slot 20. With the lever 22 at the lower end of slot 20, louvers 32 are closed. The flow limiter 66 prevents the lever 22 from moving to its maximum lower position.

What is claimed is:

1. In combination with an airflow register for an enclosure, said airflow register having control means to vary the volume of air being conducted through said register, said control means being movable between an open position and a closed position, with said control means in said open position air is to flow through said airflow register, with said control means in said closed position air is being prevented from flowing through said airflow register, said control means being connected to a first lever, said first lever being manually operable to move said control means between said open position and said closed position, the improvement comprising:

light sensor means mounted within said enclosure, a motor, said light sensor means to cause operation of said motor, said control means being connected to a second lever, said second lever being operable separate from said first lever to move said control means between said open position and said closed position, said motor being connected to said second lever, said motor to move said control means through said second lever to said open position upon observable light being detected by said light sensor, said motor to move said control means through said second lever to said closed position upon an observable darkened environment being detected by said light sensor within said enclosure; and a flow limiter in the form of a plug insertable within a slot to prevent movement of said first lever completely to said one end of said slot thereby locating said control means in a partially open position permitting some flow of air through said register face panel.

2. The combination as defined in claim 1 wherein:
said control means comprising a series of louvers.

3. The combination as defined in claim 1 wherein:
said light sensor means being mounted on said register.

4. The combination as defined in claim 3 wherein:
said airflow register having a register face panel, said slot formed in said register face panel, said first lever being movable within said slot, with said first lever located at one end of said slot said control means being in said closed position.

5. The combination as defined in claim 1 including:
timing means interconnected between said light sensor means and said motor, said timing means to cause operation of said motor only after a continuous duration of a preset period of time of either said observable condition which would cause activation of said motor.

6. The combination as defined in claim 5 wherein:
said control means comprising a series of louvers.

7. The combination as defined in claim 6 wherein:
said light sensor means being mounted on said register.

* * * * *